US011919178B2

(12) United States Patent
Bessac et al.

(10) Patent No.: US 11,919,178 B2
(45) Date of Patent: *Mar. 5, 2024

(54) FOLDING KNIFE WITH FRAME LOCK GUARD

(71) Applicant: Fiskars Brands, Inc., Middleton, WI (US)

(72) Inventors: Grant Bessac, Beaverton, OR (US); Seth Jaramus, Portland, OR (US)

(73) Assignee: FISKARS BRANDS, INC., Middleton, WI (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/704,584

(22) Filed: Mar. 25, 2022

(65) Prior Publication Data

US 2022/0212356 A1 Jul. 7, 2022

Related U.S. Application Data

(62) Division of application No. 16/573,124, filed on Sep. 17, 2019, now Pat. No. 11,285,625.

(60) Provisional application No. 62/732,926, filed on Sep. 18, 2018.

(51) Int. Cl.

*B26B 1/04* (2006.01)
*B26B 1/10* (2006.01)

(52) U.S. Cl.

CPC . *B26B 1/04* (2013.01); *B26B 1/10* (2013.01)

(58) Field of Classification Search

CPC ........... B26B 1/04; B26B 1/044; B26B 1/046; B26B 1/10
USPC ........................................... 30/153, 155–161
See application file for complete search history.

(56) References Cited

U.S. PATENT DOCUMENTS 5,131,149 A 7/1992 Thompson et al.
5,400,509 A 3/1995 Collins
5,596,808 A 1/1997 Lake et al.
5,694,692 A 12/1997 Reinschreiber
5,769,094 A 6/1998 Jenkins et al.
6,101,723 A 8/2000 Ford
(Continued)

FOREIGN PATENT DOCUMENTS

WO WO-2020/058851 A1 3/2020

OTHER PUBLICATIONS

Gerber, Photograph of Flatiron Knife, Jun. 1, 2018, 1 page.
(Continued)

*Primary Examiner* — Jason Daniel Prone
(74) *Attorney, Agent, or Firm* — FOLEY & LARDNER LLP

(57) ABSTRACT

A knife includes a blade and a handle assembly rotatably coupled to the blade, defining a longitudinal axis, and including a side frame, a handle frame spaced apart from the side frame, a locking arm coupled to the side frame and angularly movable relative to the longitudinal axis between a locked position and an unlocked position, the locking arm defined by an arm width, and a guard coupled to the side frame and overlaying at least a portion of the locking arm, the guard being defined by a guard width measured in a direction perpendicular to the longitudinal axis, the guard width being a distance between a bottom side of the guard and a top side of the locking arm, wherein a ratio of the guard width to the arm width at any given position along a length of the guard is greater than thirty percent.

12 Claims, 5 Drawing Sheets

(56) References Cited

U.S. PATENT DOCUMENTS

| | | | | |
|---|---|---|---|---|
| 6,101,724 | A | 8/2000 | Halligan | |
| 6,289,592 | B1 | 9/2001 | Emerson | |
| 6,434,831 | B2 | 8/2002 | Chen | |
| 6,553,672 | B2 | 4/2003 | Glesser et al. | |
| 6,834,432 | B1 | 12/2004 | Taylor, Jr. | |
| 7,055,407 | B2 | 6/2006 | Gringer et al. | |
| 7,165,329 | B2 | 1/2007 | Kao | |
| 7,305,768 | B2 * | 12/2007 | Hinderer | B26B 1/044 30/155 |
| 7,346,988 | B2 * | 3/2008 | Gringer | B26B 5/00 30/151 |
| 7,437,822 | B2 * | 10/2008 | Flagg | B26B 1/044 30/161 |
| 7,562,454 | B2 * | 7/2009 | Steigerwalt | B26B 1/044 30/159 |
| 7,774,940 | B2 * | 8/2010 | Frank | B26B 1/044 30/155 |
| 8,499,460 | B1 * | 8/2013 | Pearman | B26B 1/044 30/158 |
| 8,752,298 | B2 * | 6/2014 | Collins | B26B 1/044 30/160 |
| 8,863,394 | B2 * | 10/2014 | Lo | B26B 1/044 30/155 |
| D813,341 | S * | 3/2018 | Jaramus | B26B 1/046 D22/118 |
| D844,737 | S * | 4/2019 | Jaramus | B26B 1/046 D22/118 |
| 11,285,625 | B2 * | 3/2022 | Bessac et al. | B26B 1/04 |
| 2002/0104220 | A1 | 8/2002 | Marfione | |
| 2004/0154170 | A1 | 8/2004 | Kain et al. | |
| 2007/0151110 | A1 * | 7/2007 | Chen | B26B 1/044 30/155 |
| 2010/0212163 | A1 * | 8/2010 | Liu | B26B 1/044 30/159 |
| 2010/0242287 | A1 * | 9/2010 | Jameson | B26B 1/10 30/157 |
| 2010/0325897 | A1 * | 12/2010 | Chu | B26B 1/046 30/161 |
| 2011/0067246 | A1 * | 3/2011 | Perez | B26B 1/044 30/158 |
| 2012/0144677 | A1 * | 6/2012 | Chang | B26B 1/044 30/161 |
| 2013/0318798 | A1 * | 12/2013 | Elsener | B26B 1/10 30/156 |
| 2014/0115898 | A1 * | 5/2014 | Collins | B26B 1/044 30/159 |
| 2014/0259687 | A1 * | 9/2014 | Griffey | B26B 1/044 30/159 |
| 2014/0360023 | A1 * | 12/2014 | Lake | B26B 1/044 30/161 |
| 2015/0082640 | A1 | 3/2015 | Huff | |
| 2015/0343650 | A1 * | 12/2015 | Valdez | B26B 1/044 30/158 |
| 2016/0052151 | A1 * | 2/2016 | Chu | B26B 1/04 30/161 |
| 2017/0334077 | A1 | 11/2017 | Onion et al. | |
| 2018/0021963 | A1 * | 1/2018 | Liao | B26B 1/048 30/161 |

OTHER PUBLICATIONS

International Search Report and Written Opinion for International Application No. PCT/IB2019/057826, dated Jan. 13, 2020, 10 pages.

* cited by examiner

FOLDING KNIFE WITH FRAME LOCK GUARD

CROSS-REFERENCE TO RELATED APPLICATION

This application is a divisional of U.S. application Ser. No. 16/573,124, filed on Sep. 17, 2019, which has since issued as U.S. Pat. No. 11,285,625, which claims the benefit of and priority to U.S. Provisional Application No. 62/732,926, filed Sep. 18, 2018, all of which are incorporated herein by reference in their entireties.

BACKGROUND

The present invention relates generally to knives. More specifically, the present invention relates to folding knives and in particular to frame lock folding knives.

Frame lock folding knives typically include an over-rotation inhibiting disc that is coupled to a handle, which inhibits the over rotation of a locking mechanism. However, over-rotation inhibiting discs do not inhibit a user from inadvertently actuating the locking mechanism while opening or closing the knife. This can lead to reduced user satisfaction.

SUMMARY

One embodiment relates to a knife that includes a blade and a handle assembly rotatably coupled to the blade. The handle assembly includes a side frame, a locking arm coupled to the side frame and movable between a locked position and an unlocked position and a guard. The locking arm defines an arm length. The guard is coupled to the side frame and overlays at least a portion of the locking arm. The guard defines a guard length in a direction parallel to the arm length, and a ratio of the guard length to the arm length is greater than seventy-five percent (75%).

Another embodiment relates to a knife that includes a blade, and a handle assembly rotatably coupled to the blade and defining a longitudinal axis. The handle assembly includes a side frame, a locking arm coupled to the side frame and movable between a locked position and an unlocked position, and a guard. The locking arm defines an arm width in a direction perpendicular to the longitudinal axis. The guard is coupled to the side frame and overlays at least a portion of the locking arm. The guard defines a guard width in a direction perpendicular to the longitudinal axis, and a ratio of the guard width to the arm width at any given position along the longitudinal axis is greater than thirty percent (30%).

Another embodiment relates to a knife that includes a blade, and a handle assembly rotatably coupled to the blade and defining a longitudinal axis. The handle assembly includes a handle frame, a side frame coupled to the handle frame, and a locking arm coupled to the side frame by a living hinge and movable between a locked position and an unlocked position. The living hinge biases the locking arm toward the locked position. The locking arm defines an arm width in a direction perpendicular to the longitudinal axis and an arm length in a direction parallel to the longitudinal axis. A guard is coupled to the side frame and overlays at least a portion of the locking arm. The guard defines a guard width in a direction perpendicular to the longitudinal axis and a guard length in a direction parallel to the longitudinal axis. A ratio of the guard width to the arm width at any given position along the longitudinal axis is greater than thirty percent (30%), and a ratio of the guard length to the arm length is greater than seventy-five percent (75%).

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, a folding knife is shown and described that includes a blade pivotably coupled to a handle assembly and movable between a deployed, or "use" position and a stowed, or "storage" position. The handle assembly includes a side frame, a liner, and a handle frame. A locking arm is connected to the side frame by a living hinge. The locking arm is structured to move between a locked position and an unlocked position and is biased toward the locked position by the living hinge. A lock guard is connected to the side frame and partially covers the locking arm. The lock guard is positioned to inhibit a user from actuating or pressing on the locking arm while moving the blade between the use position and the storage position.

Figure 1:
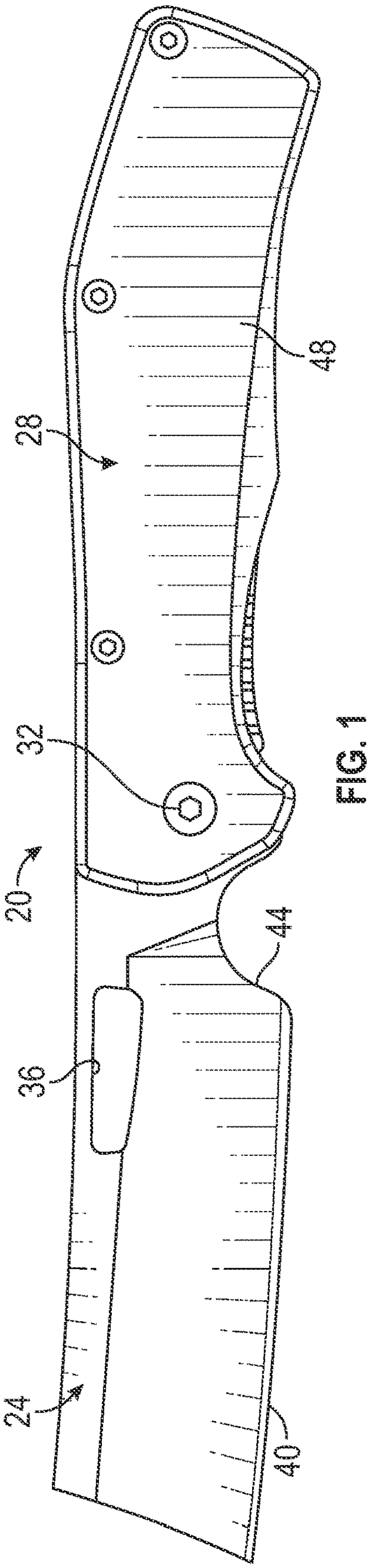
FIG. 1 is a front view of a knife in an open or deployed position, according to an exemplary embodiment.

Referring to FIG. 1, a knife 20 includes a blade 24 that is rotatably coupled to a handle assembly 28. In some examples, the blade 24 is secured to the handle assembly 28 using an axle, shown as pivot pin 32. The blade 24 is configured to rotate about the pivot pin 32 between a stowed position (shown in FIG. 5) and a deployed position (shown in FIG. 1). The blade 24 can be formed of a hardened or otherwise rigid material, and is adapted for cutting, chopping, and/or slicing objects. The blade 24 can include an opening feature, shown as an opening aperture 36, along with a cutting edge 40 and a finger choil 44. The opening aperture 36 can be formed through the top section of the blade 24, for example, and serves as a gripping feature to help a user grab and control the blade 24. For example, the opening aperture 36 can be sized to receive a portion of the user's thumb for actuating the blade 24 between a deployed position and a storage position. The shape and location of the opening aperture 36 can also be varied to accommodate different blade shapes and sizes. Although shown as a negative feature (i.e., a recess or aperture), positive shapes and/or protrusions can also be incorporated into or otherwise coupled to the blade 24 to serve as an opening feature. For example, the opening feature can instead be an opening stud or cylindrical protrusion (not shown).

Figure 2:
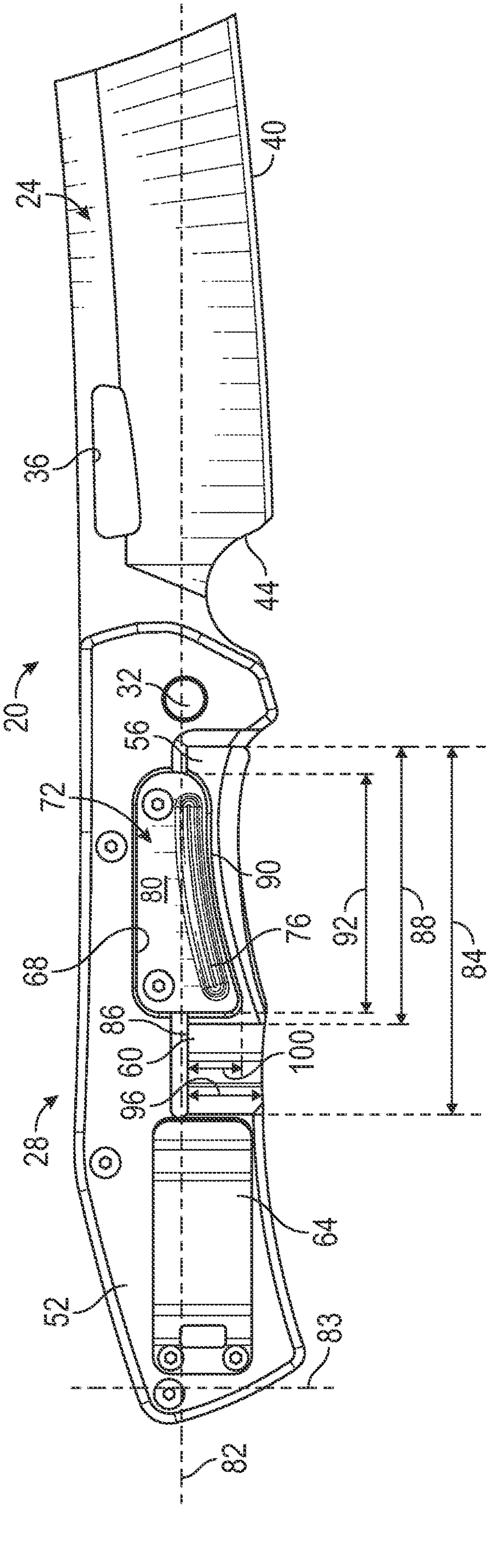
FIG. 2 is a back view of the knife of FIG. 1 in the open position.

The handle assembly 28 includes a handle frame 48. The handle frame 48 is shaped to receive at least a portion of the blade 24, and can be further contoured to provide ergonomic comfort to the user while using and/or grasping the knife 20. As shown in FIG. 2, the handle assembly 28 includes a side frame 52 positioned on an opposite side of the knife 20 from the handle frame 48. The side frame 52 and handle frame 48 are spaced apart from one another and extend approximately parallel to one another along the length of the knife 20. The side frame 52 and handle frame 48 together define a cavity 50 that is configured to receive a portion of the blade 24, including the cutting edge 40, when the blade 24 is in the storage position.

The side frame 52 includes a locking arm 56 connected to the side frame 52 by a living hinge 60. The locking arm 56 prevents unwanted rotation of the blade 24 from the deployed position into the storage position by blocking the rotation of the blade 24 relative to the handle assembly 28. The locking arm 56 is actuatable between a locked position (shown in FIG. 2) and an unlocked position (shown in FIG. 6). The living hinge 60 biases the locking arm 56 inward, toward the locked position. The inward bias of the locking arm 56 causes the locking arm 56 to engage the blade 24 in the storage position, creating interference and friction that resists unwanted rotation of the blade 24 away from the handle assembly 28. Pulling on the blade 24 (e.g., by grabbing the opening aperture 36) can overcome the inward bias of the locking arm 56. As the blade 24 rotates, contact between the blade 24 and locking arm 56 flexes the locking arm 56 outward, toward the unlocked position, which allows the blade 24 to rotate. Once the blade 24 has rotated beyond the locking arm 56, the natural bias of the living hinge 60 returns the locking arm 56 to the inward, locked position, where the locking arm 56 engages a tang 42 of the blade 24 and resists rotation of the blade 24 relative to the handle assembly 28.

The handle assembly 28 can also include mounting features that allow a user to readily access and stow the knife. For example, a pocket clip 64 can be fastened to the side frame 52. The pocket clip 64 is sized to engage a pocket of the user's pants to hold the knife 20 in place. The pocket clip 64 can be secured to the handle assembly 28 using screws or other fasteners, which are anchored to the side frame 52. The side frame 52 and handle frame 48 can be formed of various materials, including metallic materials (e.g., aluminum), polymeric materials (e.g., G10 nylon), composite materials (e.g., carbon fiber), or some combination of these materials.

In addition to the locking arm 56 and pocket clip 64, the side frame 52 also defines a guard recess 68. The guard recess 68 can extend into the side frame 52, and can have a generally concave shape that is sized to receive a frame lock guard 72. In some examples, the guard recess 68 extends partially, but not entirely through the side frame 52. An elongate shoulder 70 is then formed inward from an outermost surface 74 of the side frame 52. In some examples, the perimeter of the elongate shoulder 70 mimics a portion of the frame lock guard 72.

The frame lock guard 72 is positioned within the guard recess 68. The frame lock guard 72 can be a generally flat, plate-like component that extends over at least a portion of the locking arm 56 to prevent incidental contact and actuation of the locking arm 56. The frame lock guard 72 can be fastened or otherwise coupled to the side frame 52. In some examples, the lock guard 72 includes a grip feature. For example, a protrusion or ridge 76 can extend away from a face surface 80 of the frame lock guard 72. The ridge 76 can extend along a portion of the length of the frame lock guard 72, and can be defined by a generally constant, semi-circular cross-section, for example. In some embodiments, the ridge 76 is defined by a curvature and extends concentrically with a portion of the outer perimeter of the frame lock guard 72. The face surface 80 of the frame lock guard 72 can sit substantially flush with an outer surface of the side frame 52, such that the ridge 76 extends outwardly beyond the side frame 52 to form a stop or grip. The guard recess 68, which receives the frame lock guard 72, can be formed with a depth that corresponds to a thickness of the frame lock guard 72 so the face surface 80 of the frame lock guard 72 is flush with the outer surface of the side frame 52.

With continued reference to FIG. 2, a longitudinal axis 82 is defined along the length of the knife 20 and a width axis 83 is defined perpendicular to the longitudinal axis 82. The knife 20 is defined by a series of different length relationships that enable the frame lock knife 20 to function effectively and readily transition between the stowed position and the deployed position, and vice versa. For example, an arm and hinge length 84 is defined by the locking arm 56 and the living hinge 60 and measured parallel to the longitudinal axis 82. An arm length 88 is defined by the locking arm 56 and measured parallel to the longitudinal axis 82. A guard length 92 is defined by the frame lock guard 72 and measured parallel to the longitudinal axis 82. Accordingly, the arm and hinge length 84, the arm length 88, and the guard length 92 are defined in parallel relation to one another along a length of the knife 20, parallel to the longitudinal axis 82.

The relationships between arm and hinge length 84, arm length 88, and guard length 92 can be chosen so that the locking arm 56 can provide the necessary bias on the blade 24 without being subjected to unwanted, friction-inducing forces that might otherwise impact the blade 24 from transitioning from the stowed position to the deployed position. For example, the ratio of guard length 92 to arm and hinge length 84 can be less than 100% so that at least a portion of the locking arm 56 and living hinge 60 remain exposed outward beyond the frame lock guard 72. This arrangement allows the locking arm 56 and hinge 60 to remain movable relative to the frame lock guard 72, and provides areas of access so that a user can intentionally contact and actuate the locking arm 56 to transition the knife between deployed and stowed positions. In some embodiments, the guard length 92 is about sixty-six percent (66%) of the arm and hinge length 84, allowing a portion of the living hinge 60 and a portion of the locking arm 56 to extend outwardly beyond each side of the frame lock guard 72. In some embodiments, a ratio of the guard length 92 to the arm and hinge length 84 is between about fifty percent (50%) and about eighty percent (80%). The frame lock guard 72 can be positioned forward of the living hinge 60 so that the entire living hinge 60 is exposed relative to the frame lock guard 72.

The frame lock guard 72 is designed to cover a significant portion of the locking arm 56, so that incidental contact between the hands of a user and the locking arm 56 is limited or avoided altogether. The locking arm 56 can straddle the frame lock guard 72 so that a portion of the locking arm 56 extends outwardly from each side (e.g., the front side and back side, determined based upon relative position along the longitudinal axis 82) of the frame lock guard 72. By leaving a portion of the locking arm 56 uncovered by the frame lock guard 72, a user can intentionally actuate the locking arm 56 by directly contacting the locking arm 56. In some examples, the frame lock guard 72 is positioned toward the living hinge 60, so that the distal end of the locking arm 56 remains readily accessible and movable by the fingers of a user. In some embodiments, a ratio of the guard length 92 to the arm length 88 can be about eighty-seven percent (87%). To create the necessary amount of accessibility to the locking arm 56 while still restricting unwanted actuation, the ratio of the guard length 92 to the arm length 88 should be between about seventy-five percent (75%) to about one hundred percent (100%).

The longitudinal sizing and positioning, along with the width and latitudinal relationship (i.e., relative to the width axis 83) of the frame lock guard 72 and locking arm 56 allow the frame lock guard 72 to prevent or inhibit incidental contact with the locking arm 56 while still allowing access to intentionally actuate the locking arm 56. A series of dimensional relationships can again determine the frame lock guard's 72 effectiveness. For example, a locking arm width 96 is defined by the locking arm 56 in a direction parallel to the width axis 83. The locking arm width 96 varies along the locking arm length 88. In some embodiments, the locking arm width 96 is at a maximum proximate the living hinge 60. The locking arm width 96 can be smaller at the distal end of the locking arm 56 than the proximal end of the locking arm 56. A guard width 100 is defined by both the locking arm 56 and the frame lock guard 72 in a direction parallel to the width axis 83. The guard width 100 is defined by the distance between the top side 86 of the locking arm 56 to the bottom side 90 of the frame lock guard 72. The guard width 100 varies along the guard length 92 as well. Like the locking arm 56, the guard width 100 can be at a maximum nearest the living hinge 60 and at a minimum nearest the distal end of the locking arm 56.

In some embodiments, a ratio of the guard width 100 to the locking arm width 96 at any given position along the guard length 92 is between about forty-five percent (45%) and about seventy percent (70%) to allow a portion of the locking arm 56 to remain exposed below the frame lock guard 72. In some embodiments, the ratio of the guard width 100 to the locking arm width 96 is about seventy percent (70%) at an end of the frame lock guard 72 distal from the blade 24 (i.e., proximate the living hinge 60), and about forty five percent (45%) at an end of the frame lock guard 72 proximate to the blade 24 (i.e., proximate the distal end of the locking arm 56). In some embodiments, the ratio of the guard width 100 to the locking arm width 96 is consistent (e.g., ~50%) along the guard length 92. In some embodiments, the ratio of the guard width 100 to the locking arm width 96 is between about thirty percent (30%) and about one hundred percent (100%).

Figure 3:
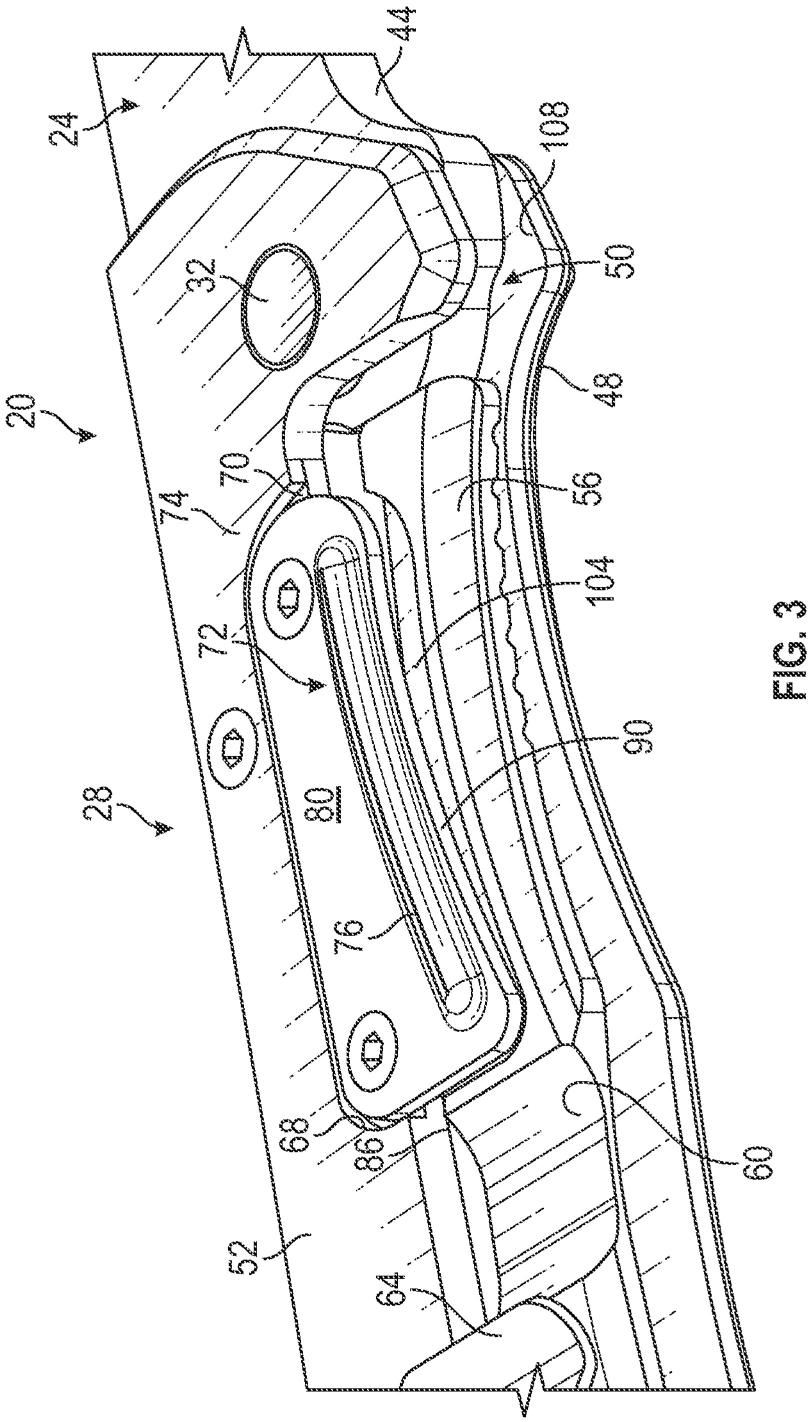
FIG. 3 is a perspective detail view of the knife of FIG. 1 in the open position.

As shown in FIG. 3, the guard recess 68 is sized so that the face surface 80 of the frame lock guard 72 is flush with the outer surface of the side frame 52. The locking arm 56 can also include an arm recess 104 shaped to receive a portion of the frame lock guard 72. The arm recess 104 can be formed with a shape complimentary to the bottom side 90 of the frame lock guard 72, and can be arranged to form a clearance fit around the frame lock guard 72 when the locking arm 56 is biased outward, into the unlocked position (which is located outward from the locked position shown in FIG. 3). In some examples, engagement between the frame lock guard 72 and the base of the arm recess 104 can serve as a stop to prevent the locking arm 56 from being over-actuated outward, beyond the desired unlocked position. A depth of the arm recess 104 can be approximately equal to the thickness of the frame lock guard 72, so that when the locking arm 56 is moved to the unlocked position, the outer surface of the side frame 52, the face surface 80, and the outer surface of the locking arm extend generally flush to one another.

Figure 4:
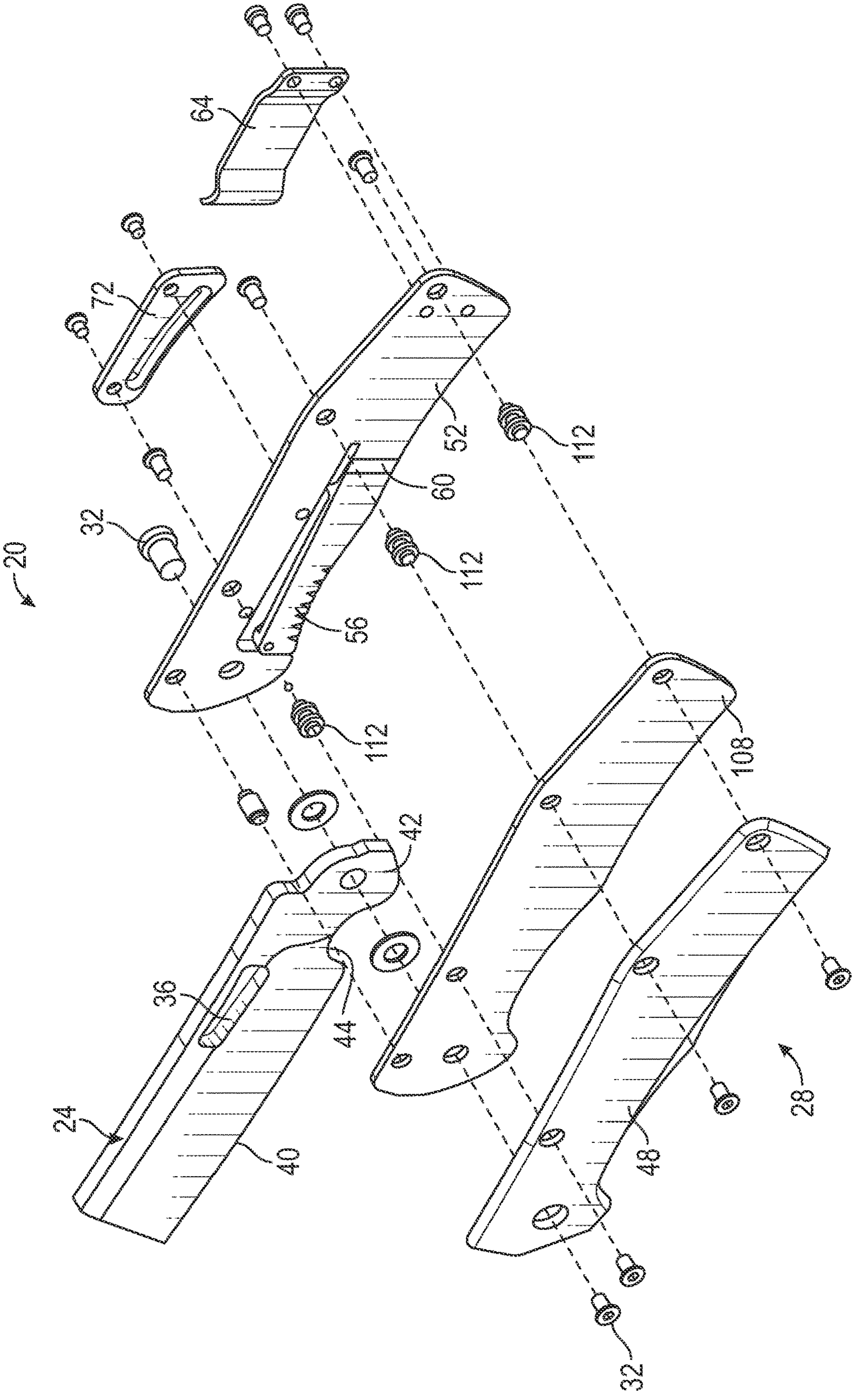
FIG. 4 is an exploded view of the knife of FIG. 1.

FIG. 4 demonstrates the internal structure and fastening architecture of the knife 20. In some examples, a liner 108 is fastened to the handle frame 48. Because the handle frame 48 may be formed thinner than the side frame 52, the liner 108 can be used to help balance and center the blade 24 within the handle assembly 28. The liner 108 can be spaced apart from the side frame 52 by spacers 112, which creates the cavity 50 that receives and protects the blade 24 in the storage configuration. While FIG. 4 shows the components of the knife 20 secured together using a plurality of different removable fasteners, various other coupling mechanisms and techniques can be used to create the knife 20. In some embodiments, some or all parts of the handle assembly 28 are adhered, welded, brazed, fused, or otherwise connected or coupled without the use of removable fasteners.

Figure 5:
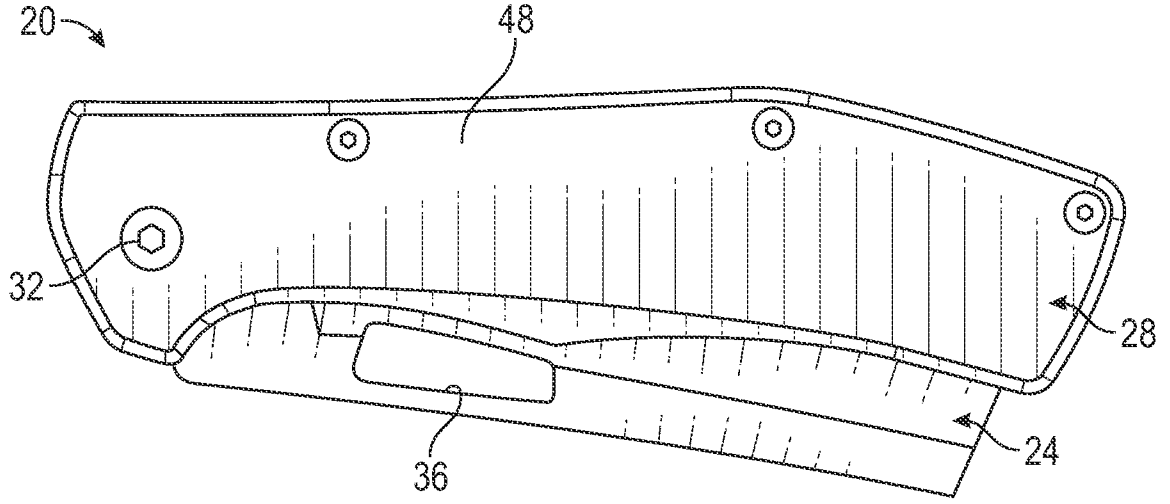
FIG. 5 is a front view of the knife of FIG. 1 is a closed, or stowed position.
Figure 6:
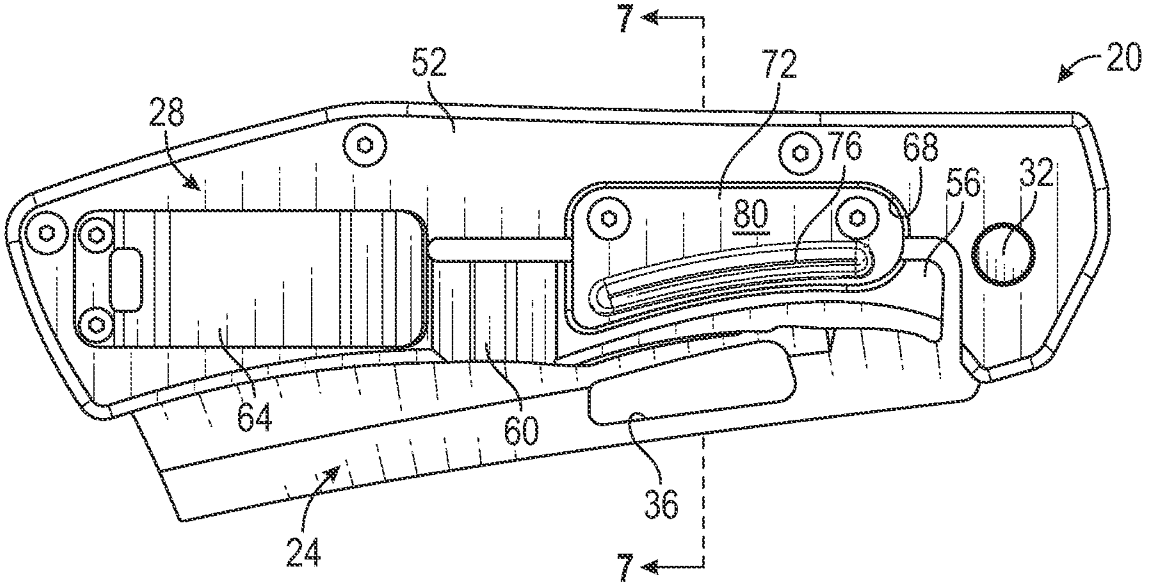
FIG. 6 is a back view of the knife of FIG. 1 in the closed position.

FIGS. 5 and 6 show the knife 20 in the storage position. The blade 24 is rotated toward the handle assembly 28, so that the the cutting edge 40 is received within the cavity 50 and hidden within the handle assembly 28. The portion of the blade 24 positioned within the cavity 50 interferes with the locking arm 56, and prevents the locking arm 56 from reaching the locked position within the cavity 50. Instead, the locking arm 56 is rotated about the living hinge 60 outward, into the unlocked position, with an end of the locking arm 56 resting on the blade 24. The interference between the locking arm 56 resists, but does not prevent rotation of the blade 24 relative to the handle assembly 28 so that a user can still rotate the blade 24 to the deployed position. To deploy the blade 24, a user can grab onto the blade 24 with one hand and grab onto the handle assembly 28 with the other hand. The opening aperture 36 is exposed and in a position that can be easily engaged by the user's thumb, and creates a grip point that can be pulled on to begin rotation of the blade 24 outward from the frame assembly 28. The frame lock guard 72 is positioned so as to provide a gripping location for the user that allows the handle assembly 28 to be securely grasped without pressing on or impinging on the locking arm 56. Pressing or otherwise forcing the locking arm 56 into the blade 24 can introduce additional friction and interference between the blade 24 and locking arm 56 that resists rotation toward the deployed position, which can be frustrating for a user. The frame lock guard 72 creates a barrier that impedes the hands of a user from contacting the locking arm 56. In other words, the frame lock guard 72 inhibits accidental actuation of the locking arm 56 toward the locked position.

Figure 7:
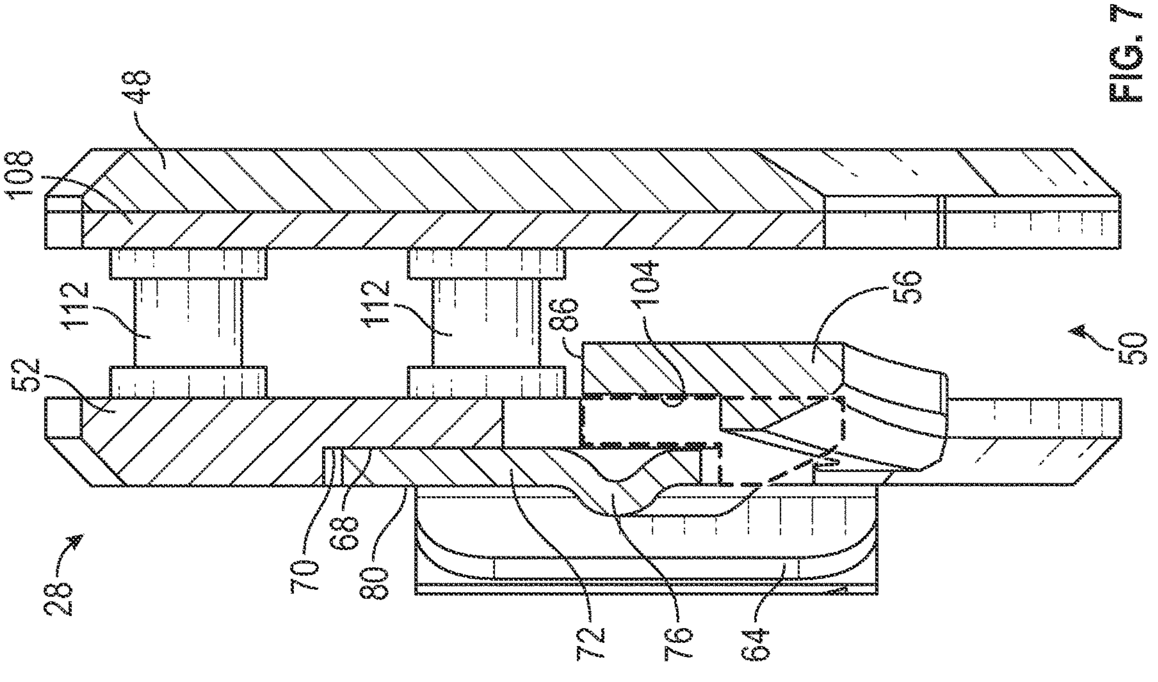
FIG. 7 is a sectional view of the knife of FIG. 1 taken along line 7-7 of FIG. 6 with a blade removed.

As shown in FIG. 7 and as explained above, the ridge 76 of the frame lock guard 72 projects outward of the face surface 80. The ridge 76 protrudes farther from a center line of the handle assembly 28 than the locking arm 56 in the locked position (shown in solid lines) and the unlocked position (shown in dashed lines). The raised profile of the ridge creates a reference point and gripping section for the user, who can know without looking at the handle that his or her hands are positioned properly upon the frame lock guard 72 before deploying the blade 24 of the knife 20. FIG. 7 also shows how the frame lock guard 72 is received within the arm recess 104 of the locking arm 56 while the locking arm 56 is arranged in the unlocked position.

Figure 8:
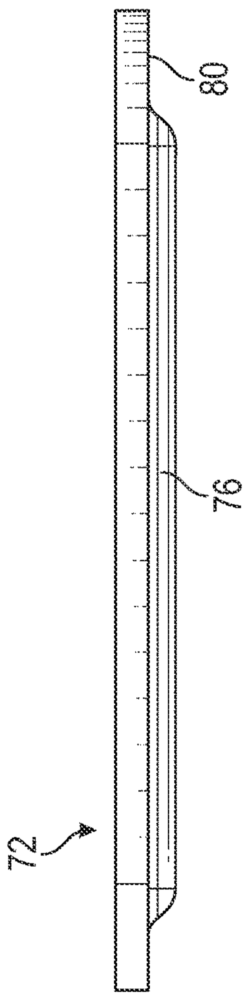
FIG. 8 is a side view of a frame lock guard of the knife of FIG. 1.
Figure 9:
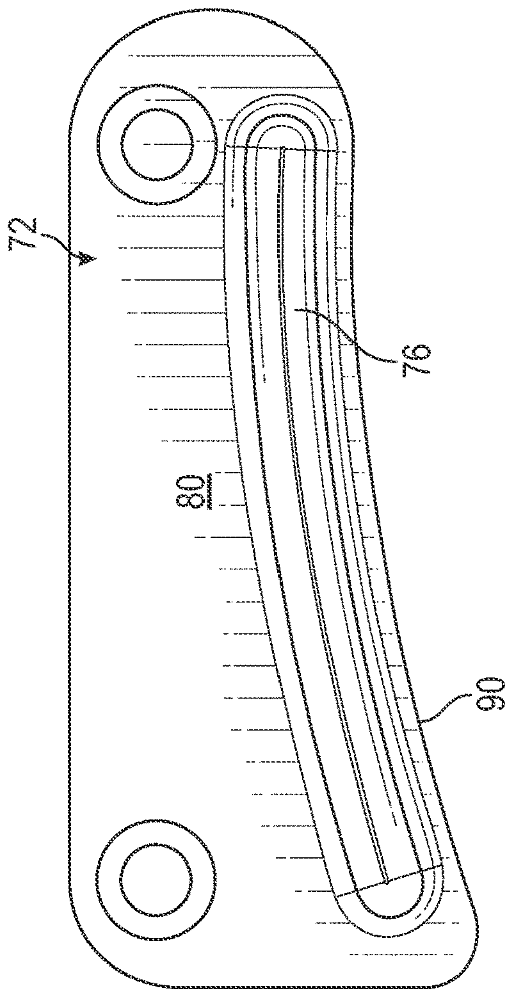
FIG. 9 is a front view of the frame lock guard of FIG. 8.

FIGS. 8 and 9 show additional details of the frame lock guard 72. Specifically, the ridge 76 is an arcuate projection that protrudes from the face surface 80. In some embodiments, the grip feature includes a knurled texture, studs, pyramidal protrusions, or a different shaped ridge. Additionally, the frame lock guard 72 is shown as a separate component that is fastened to the side frame 52. In some embodiments, the frame lock guard 72 can be formed as a part of the side frame 52 or adhered to the side frame 52, as desired.

The frame lock guard 72 advantageously inhibits a user from gripping or pressing on the locking arm 56 unintentionally. For example, as the user engages the opening aperture 36 on the blade 24, if the user presses inadvertently on the locking arm 56, the actuation of the blade 24 to the use position (see FIG. 1) is inhibited and feels less than ideal to the user. The frame lock guard 72 inhibits the user from pressing the locking arm 56 inadvertently and avoids situation of less than smooth actuation between the use position and the storage position.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges or geometric relationships provided. Accordingly, these terms should be interpreted as indicating that insubstantial or inconsequential modifications or alterations of the subject matter described and claimed are considered to be within the scope of the invention as recited in the appended claims.

While the detailed drawings and specific examples given describe various exemplary embodiments of the camping utensil kit, they serve the purpose of illustration only. It is to be understood that the invention is not limited in its application to the details of construction and the arrangements of components set forth in the preceding description or illustrated in the drawings. Furthermore, other substitutions, modifications, changes, and omissions may be made in the design, operating conditions, and arrangements of the exemplary embodiments without departing from the scope of the invention.

What is claimed is:

1. A knife comprising:

a blade; and a handle assembly rotatably coupled to the blade, defining a longitudinal axis, and including a side frame, a handle frame spaced apart from the side frame, at least a portion of the blade received between the handle frame and the side frame;

a locking arm coupled to the side frame and angularly movable relative to the longitudinal axis between a locked position and an unlocked position, the locking arm defined by an arm width measured in a direction perpendicular to the longitudinal axis, and a guard coupled to the side frame and overlaying at least a portion of the locking arm, the knife defining a guard width measured in a direction perpendicular to the longitudinal axis, the guard width being a distance between a bottom side of the guard and a top side of the locking arm, wherein a ratio of the guard width to the arm width at any given position along a length of the guard is greater than thirty percent (30%).

2. The knife of claim 1, wherein the ratio of the guard width to the arm width at any given position along the length of the guard is between about forty-five percent (45%) and about seventy percent (70%).

3. The knife of claim 1, wherein the ratio of the guard width to the arm width varies along the length of the guard.

4. The knife of claim 1, wherein the locking arm is further defined by an arm length measured parallel to the longitudinal axis and the length of the guard is measured parallel to the longitudinal axis, and a ratio of the length of the guard to the arm length is above seventy-five percent (75%).

5. The knife of claim 1, wherein the guard is configured to restrict outward rotation of the locking arm beyond the unlocked position by selectively engaging the portion of the locking arm that is overlaid by the guard.

6. The knife of claim 1, wherein when the locking arm is in the unlocked position, an outer surface of the side frame, a guard surface of the guard, and an outer surface of the locking arm each extend generally flush with one another.

7. The knife of claim 1, wherein the side frame includes a guard recess formed therein, the guard recess receiving a portion of the guard.

8. The knife of claim 1, wherein the guard includes a grip feature projecting from a face surface of the guard, the grip feature having an arcuate shape extending along at least fifty percent (50%) of the length of the guard.

9. The knife of claim 1, wherein the locking arm defines an arm recess formed therein, the arm recess sized to receive a portion of the guard when the locking arm is arranged in the unlocked position.

10. A knife comprising:

a blade; and a handle assembly rotatably coupled to the blade, defining a longitudinal axis, and including a handle frame, a side frame coupled to the handle frame, a locking arm coupled to the side frame by a living hinge and movable between a locked position and an unlocked position, the living hinge biasing the locking arm toward the handle frame to the locked position, the locking arm defining an arm width in a direction perpendicular to the longitudinal axis and an arm length in a direction parallel to the longitudinal axis, and a guard coupled to the side frame and overlaying at least a portion of the locking arm, the knife defining a guard width in a direction perpendicular to the longitudinal axis and a guard length in a direction parallel to the longitudinal axis, the guard width being a distance between a bottom side of the guard and a top side of the locking arm, wherein a ratio of the guard width to the arm width at any given position along the guard is greater than thirty percent (30%), and wherein a ratio of the guard length to the arm length is greater than seventy-five percent (75%).

11. The knife of claim 10, wherein the ratio of the guard width to the arm width varies along the guard, such that at any given position along the guard is between about forty-five percent (45%) and about seventy percent (70%).

12. The knife of claim 10, wherein the ratio of the guard length to the arm length is between eighty percent (80%) and ninety percent (90%), and the locking arm straddles the guard such that a first section of the locking arm is positioned forward of the guard and a second section of the locking arm is positioned rearward of the guard.

* * * * *